United States Patent
Eifert et al.

(10) Patent No.: US 10,794,667 B2
(45) Date of Patent: Oct. 6, 2020

(54) OPTICAL THERMAL PROFILE

(71) Applicants: Rolls-Royce North American Technologies Inc., Indianapolis, IN (US); Rolls-Royce Corporation, Indianapolis, IN (US)

(72) Inventors: Andrew Eifert, Indianapolis, IN (US); Eric Wilson, Mooresville, IN (US); Russell White, Indianapolis, IN (US); Mark Jon Blackwelder, Plainfield, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 729 days.

(21) Appl. No.: 15/398,380

(22) Filed: Jan. 4, 2017

(65) Prior Publication Data
US 2018/0259302 A1 Sep. 13, 2018

(51) Int. Cl.
- *F41H 13/00* (2006.01)
- *F28F 27/00* (2006.01)
- *G05B 15/02* (2006.01)
- *F28D 15/00* (2006.01)

(52) U.S. Cl.
CPC .......... *F41H 13/005* (2013.01); *F28F 27/00* (2013.01); *G05B 15/02* (2013.01); *F28D 15/00* (2013.01)

(58) Field of Classification Search
None
See application file for complete search history.

(56) References Cited

U.S. PATENT DOCUMENTS

| | | | | | |
|---|---|---|---|---|---|
| 4,614,913 A | * | 9/1986 | Honeycutt | ............ | F41H 13/005 356/152.3 |
| 4,979,180 A | * | 12/1990 | Muncheryan | .......... | A61B 18/20 372/92 |
| 5,422,899 A | * | 6/1995 | Freiberg | .................. | H01S 3/042 372/25 |

(Continued)

FOREIGN PATENT DOCUMENTS

WO WO 2012/158607 A1 11/2012

OTHER PUBLICATIONS

Park,, C., Vallury, A. and Perez, J., "Advanced hybrid cooling loop technology for high performance thermal management", 4th International Energy Conversion Engineering Conference, Jun. 26-29, 2006, San Diego, California. (Year: 2006).*

(Continued)

*Primary Examiner* — Mohammad Ali
*Assistant Examiner* — Kelvin Booker
(74) *Attorney, Agent, or Firm* — Brinks Gilson & Lione

(57) ABSTRACT

Systems and methods thermal management of a directed energy weapon are provided. The system may include a controller module executable by a processor to determine a planned energy emission from a light-emitting diode (LED) of the directed energy weapon. The controller module may generate a cooling instruction to influence a temperature of the LED with a cooling fluid in response to the planned energy emission. The controller module may cause the cooling fluid to be applied to the LED in accordance with the cooling instruction prior to a start of the planned energy emission of the LED.

18 Claims, 4 Drawing Sheets

(56) References Cited

U.S. PATENT DOCUMENTS

| | | | |
|---|---|---|---|
| 5,820,626 A * | 10/1998 | Baumgardner | A61B 18/0218 606/13 |
| 6,354,370 B1 * | 3/2002 | Miller | F25B 19/00 165/263 |
| 6,625,184 B1 * | 9/2003 | Stingl | H01S 3/025 372/34 |
| 6,931,046 B1 * | 8/2005 | Ault | H01S 3/022 372/51 |
| 7,193,771 B1 * | 3/2007 | Smith | H01S 3/042 359/333 |
| 7,252,385 B2 | 8/2007 | Engle et al. | |
| 8,608,348 B2 | 12/2013 | Maxik et al. | |
| 8,720,219 B1 * | 5/2014 | Sheik-Bahae | F25B 23/00 372/34 |
| 8,826,973 B2 * | 9/2014 | Moxley | E21B 7/14 166/77.2 |
| 9,209,598 B1 * | 12/2015 | Reagan | H01S 5/024 |
| 9,310,167 B1 * | 4/2016 | Farmer | H01S 3/025 |
| 9,362,706 B2 * | 6/2016 | Sugiyama | H01S 3/0014 |
| 10,389,078 B2 * | 8/2019 | Smiley | B64C 27/00 |
| 2003/0063884 A1 * | 4/2003 | Smith | G02B 6/032 385/129 |
| 2005/0107852 A1 * | 5/2005 | Levernier | A61B 18/203 607/89 |
| 2006/0083276 A1 * | 4/2006 | Brown | H01S 3/042 372/36 |
| 2006/0274797 A1 | 12/2006 | Myers et al. | |
| 2007/0183474 A1 * | 8/2007 | Spariosu | B82Y 20/00 372/79 |
| 2008/0198883 A1 * | 8/2008 | Vetrovec | F41H 13/005 372/35 |
| 2009/0001372 A1 * | 1/2009 | Arik | C09K 5/10 257/58 |
| 2010/0027276 A1 | 2/2010 | Kornitz et al. | |
| 2010/0044103 A1 * | 2/2010 | Moxley | E21B 7/14 175/16 |
| 2010/0189137 A1 * | 7/2010 | Shkunov | H01S 3/04 372/6 |
| 2010/0236758 A1 * | 9/2010 | Ullman | B64D 13/00 165/104.19 |
| 2011/0315354 A1 * | 12/2011 | Johnson | H05K 7/20636 165/104.33 |
| 2012/0261104 A1 * | 10/2012 | Kelly | B23K 1/0012 165/177 |
| 2012/0263940 A1 * | 10/2012 | Arzberger | C09K 5/14 428/328 |
| 2014/0123729 A1 * | 5/2014 | Kachanov | H01S 5/0028 73/24.02 |
| 2014/0125993 A1 * | 5/2014 | Kachanov | G01J 3/26 356/519 |
| 2014/0338863 A1 * | 11/2014 | Protz | H01M 10/052 165/80.4 |
| 2015/0202005 A1 * | 7/2015 | Fuflyigin | A61B 18/203 606/12 |
| 2015/0308194 A1 * | 10/2015 | Moxley | E21B 7/14 175/16 |
| 2016/0120019 A1 * | 4/2016 | Shedd | H05K 1/0204 361/679.47 |
| 2016/0120059 A1 * | 4/2016 | Shedd | H05K 7/208 165/244 |
| 2016/0153751 A1 * | 6/2016 | Hagen | F41H 13/0062 398/113 |
| 2017/0117681 A1 * | 4/2017 | Kopf | H01S 3/08072 |
| 2017/0191314 A1 * | 7/2017 | Faircloth | E21B 7/14 |

OTHER PUBLICATIONS

Seletskiy, D.V., Melgaard, S.D., Bigotta, S., Lieto, A.D., Tonelli, M., and Sheik-Bahae, M., "Laser cooling of solids to cryogenic temperatures", Nature Photonics, Jan. 17, 2010, DOI: 10.1038/NPHOTON.2009.269. (Year: 2010).*

Extended European Search Report, issued in European Application No. 17205085, dated Apr. 26, 2018, pp. 1-9, European Patent Office, Munich, DE.

Cooper, J., "Driving LED lamps—some simple design guidelines," dated Aug. 13, 2007, pp. 1-4, LEDs Magazine, vol. 4, Issue 8, retrieved from URL: http://www.ledsmagazine.com/articles/print/volum-4/issue-8/features/dr . . . © 2007-2016 PennWell Corporation, Tulsa, OK.

* cited by examiner

OPTICAL THERMAL PROFILE

TECHNICAL FIELD

This disclosure relates to directed energy weapons and, in particular, to thermal management of light emitting diodes of directed energy weapons.

BACKGROUND

Directed energy weapons that emit focused energy from Light Emitting Diodes (LEDs) may require cooling to counteract heat generated by the LEDs. In addition, directed energy weapons may operate most efficiency under particular thermal conditions. Present approaches to thermal management of the directed energy weapons suffer from a variety of drawbacks, limitations, and disadvantages. There is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, systems and methods for thermal management of a directed energy weapon are provided. For example, the system may include a controller module that may determine a planned energy emission from a light-emitting diode (LED) of the directed energy weapon. The controller module may generate a cooling instruction to influence a temperature of the LED with a cooling fluid in response to the planned energy emission. The controller module may cause the cooling fluid to be applied to the LED in accordance with the cooling instruction prior to a start of the planned energy emission from the LED.

One interesting feature of the systems and methods described below may be that the LED of the directed energy weapon may be cooled in anticipation of the planned energy emission. Alternatively, or in addition, an interesting feature of the systems and methods described below may be that the temperature of the LED may be maintained at target temperatures or near target temperatures through various possible shot scenarios, and/or other operational scenarios, of the directed energy weapon. The target temperature may be, for example, a temperature at which the LED operates at a maximum efficiency or above a target efficiency threshold. Efficiency may the total electromagnetic power output by the LED divided by the total electrical power supplied to the LED.

Figure 1:
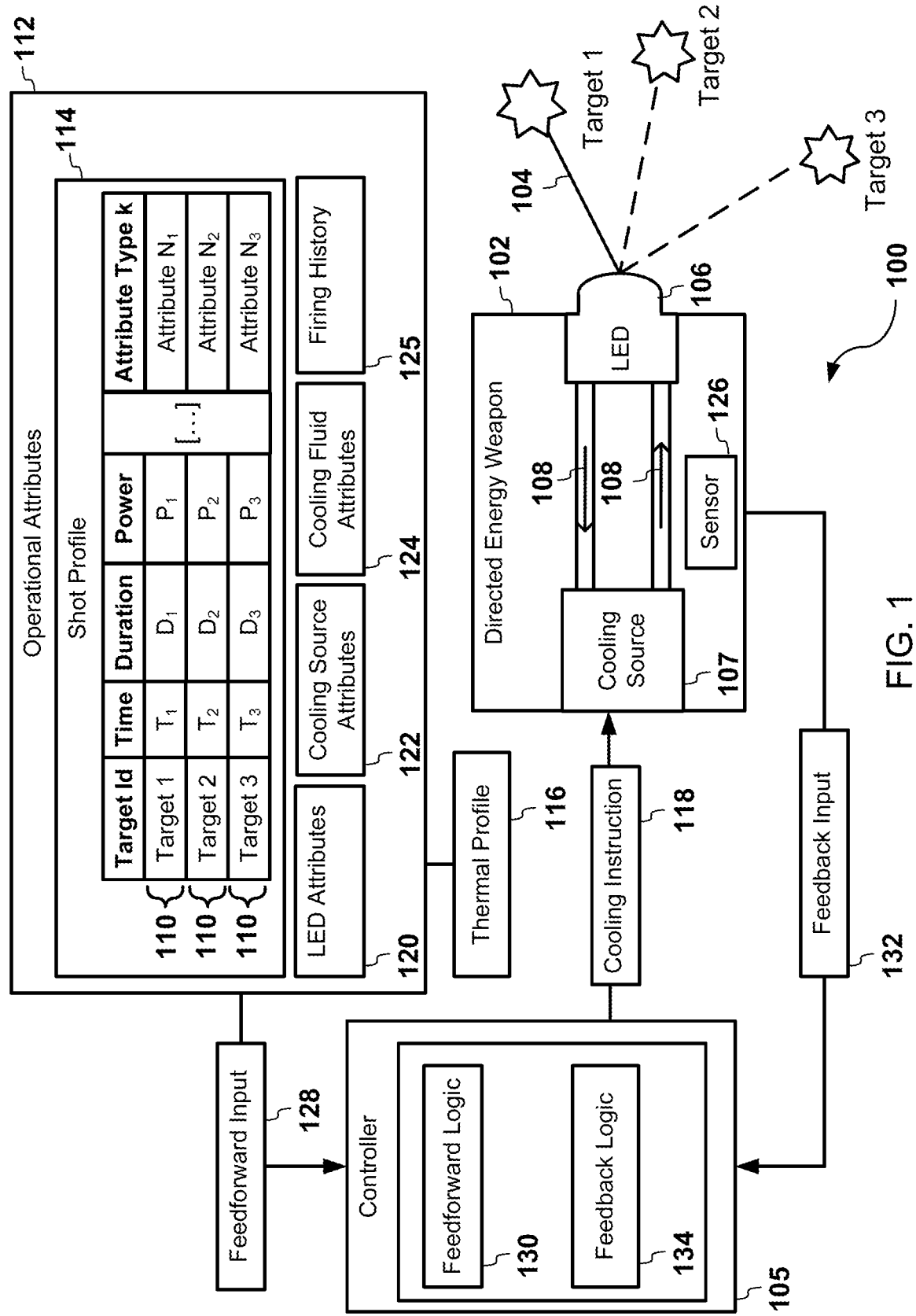
FIG. 1 illustrates an example of a system for thermal management of a directed energy weapon.

FIG. 1 illustrates an example of a system 100 for thermal management of a directed energy weapon 102. The directed energy weapon 102 may include a weapon that produces an energy emission 104 from a light emitting diode (LED) 106. Examples of the LED 106 may include a laser diode and a diode-pumped solid-state laser. The energy emission 104 from the LED 106 may include focused energy, such as a beam or any other pattern of electromagnetic radiation, such as light or electromagnetic waves outside of the visible spectrum. During operation of the LED 106, the LED 106 may produce heat, which may negatively affect the efficiency of the directed energy weapon 102. Accordingly, a controller 105 may cause a cooling source 107 to apply cooling fluid 108 to the LED 106 to control a temperature of the LED 106.

The controller 105 may utilize operational attributes 112 of the directed energy weapon 102 to determine how to influence the temperature of the LED 106 with the cooling fluid 108. For example, the controller 105 may determine a planned energy emission 110 of the directed energy weapon 102. The planned energy emission 110 may represent an expected emission of energy from the LED 106. The planned energy emission 110 may be descriptive of an anticipated energy emission of the directed energy weapon 102. In some examples, the planned energy emission 110 may include information indicative of fulfilling the planned energy emission 110. For example, as illustrated in FIG. 1, the planned energy emission 110 may include a time that the planned energy emission 110 is to occur, a duration of the planned energy emission 110, a power of the planned energy emission 110, and/or other information descriptive of the planned energy emission 110.

The planned energy emission 110 may be included in a larger set of the operational attributes 112 of the directed energy weapon 102. The operational attributes 112 may include any description an operation of the directed energy weapon 102. For example, the operational attributes 112 may be descriptive of a historical operation of the directed energy weapon 102, a runtime operation of the directed energy weapon 102, a planned operation of the directed energy weapon 102, and/or a desired operation of the directed energy weapon 102. For example, the operational attributes 112 may include a shot profile 114. The shot profile 114 may be descriptive of the future operation of the directed energy weapon 102. The shot profile 114 may include multiple planned energy emissions grouped together and configured to fire from the directed energy weapon 102 in a pre-planned sequence. In additional examples, the operational attributes 112 may include LED attributes 120, cooling source attributes 122, cooling fluid attributes 124, a firing history 125 of the directed energy weapon 102, and other attributes descriptive of the directed energy weapon 102.

The LED attributes 120 may include any attribute descriptive of the LED 106. For example, the LED attributes 120 may include a thermal output of the LED 106, an efficiency of the LED 106, an optical output of the LED 106, a temperature of the LED 106, and other attributes descriptive of the LED 106. The LED attributes 120 may include information compiled and analyzed over a history of the operation of the LED 106, such as an average temperature of the LED. In other examples, the LED attributes 120 may include desired attributes, such as a desired thermal output or a desired operational temperature. Additionally or alternatively, the LED attributes may include information acquired from a sensor 126, such as a thermocouple, measured during operation of the LED 106. Alternatively or in addition, the LED attributes 120 may include an anticipated behavior the LED 106 during the planned energy emission 110. For example, the LED attributes 120 may include an anticipated temperature of the LED 106 during the planned energy emission 110.

The cooling source attributes 122 may include any attribute related to a supply of the cooling fluid 108 to the LED 106. For example, the cooling source attributes 122 may be descriptive of preparing the cooling fluid 108, delivering the cooling fluid 108 to the LED 106, and information about the cooling source 107. For example, the cooling source attributes 122 may include a thermal delay between the cooling source 107 and the LED 106. The thermal delay may include a time required to heat and/or cool the cooling fluid 108. Alternatively or in addition, the thermal delay may include a time for the cooling fluid 108 to travel between the cooling source 107 and the LED 106, and/or any other delay in delivering the cooling fluid 108 to the LED 106 from the cooling source 107.

The operational attributes 112 may additionally include the cooling fluid attributes 124. The cooling fluid attributes 124 may include any attributes that describe the cooling fluid 108. For example, the cooling fluid attributes 124 may include the thermal characteristics of the cooling fluid 108, such as an efficiency of the cooling fluid 108. In addition, the cooling fluid attributes 124 may include a type of the cooling fluid 108 including, for example, propylene glycol (PGW), ethylene glycol (EGW), water, oil, and/or any other type of coolant. In addition, the cooling fluid 108 may include a composition of various cooling fluid types, and the cooling fluid attributes 124 may be descriptive of the ratios of the various cooling fluid types of the composition. The cooling fluid 108, despite its name, may raise the temperature of the LED 106 if the temperature of the cooling fluid 108 is higher than the temperature of the LED 106.

The firing history 125 may include a description of one or more previous energy emissions from the LED 106. For example, the firing history 125 may include the times, durations, power requirements, and other information related to a previous energy emission of the LED 106. The firing history 125 may additionally include measurements of the directed energy weapon, and other information related to the directed energy weapon, at the times the previous energy emissions occurred.

In some examples, the controller 105 may identify a thermal profile 116 associated with the operational attributes 112. The controller 105 may generate a cooling instruction 118 to cool the LED 106 in accordance with the thermal profile 116 and in response to the planned energy emission 110. The controller 105 may cause a temperature of the LED 106 to start being influenced in accordance with the cooling instruction 118 prior to the start of the planned energy emission 110. For example, the controller 105 may control a temperature of the cooling fluid 108 and/or a flow of the cooling fluid 108 in accordance with the thermal profile 116.

The thermal profile 116 may include any attribute that describes a feature related to controlling the temperature of the LED 106 with the cooling fluid 108. For example, the thermal profile 116 may include a target temperature of the cooling fluid 108, a target flow of the cooling fluid 108, and other information related to controlling the temperature of the LED 108 with the cooling fluid 108. Alternatively or in addition, the thermal profile 116 may be descriptive of variable temperature control of the LED 106 over a time interval and/or in response to certain events. For example, the thermal profile 116 may provide for varying the temperature and/or the flow of the cooling fluid 108 over a time interval, such as an operation interval of the directed energy weapon 102. In other examples, the thermal profile 116 may provide for varying the temperature and/or the flow of the cooling fluid 108 in response to certain events, such as detecting the planned energy emission 110.

Accordingly, the thermal profile 116 may provide for maintaining the LED 106 at the target temperature with the cooling fluid 108 during the course of the planned operation of the directed energy weapon 102. Further, the thermal profile 116 may provide for cooling the LED 106 with the cooling fluid 108 before the planned energy emission 110 commences. For example, the thermal profile 116 may provide for preheating the LED 106 to a predetermined temperature and subsequently cooling the LED 106 during the planned energy emission 110. Alternatively or in addition, the thermal profile 116 may provide additional cooling scenarios, such as variable temperatures and/or variable flows of the cooling fluid 108 that account for the operational attributes, such as a timing of planned energy emissions in the shot profile 114.

For example, the thermal profile 116 may provide for controlling the temperature of the LED 106 in anticipation of the planned energy emission 110. For example, the thermal profile 116 may provide the target temperature and/or the target flow of the cooling fluid 108 when the planned energy emission 110 is expected to occur at a predetermined power level, at a predetermined time, and/or for a predetermined duration. Alternatively or in addition, the thermal profile 116 may provide for controlling the temperature of the LED 106 with the cooling fluid 108 during and/or after the planned energy emission 110. In some examples, the thermal profile 116 may provide for cooling the LED 106 with the cooling fluid 108 across multiple planned energy emissions. For example, the thermal profile 116 may include the target temperatures and the target flows of the cooling fluid 108 before, during, and after the performance of multiple planned energy emissions defined by the shot profile 114.

In another example, the thermal profile 116 may provide for controlling the temperature of the LED 106 with the cooling fluid 108 based on cooling fluid attributes 124. Alternatively, or in addition the thermal profile 116 may also provide for cooling the LED 106 with the cooling fluid 108 based on cooling source attributes 124. For example, the thermal profile 116 may account for the thermal delay between the cooling source 107 and the LED 106. Accordingly the thermal profile 116 may provide for cooling the LED 106 with the cooing fluid 108 prior to the planned energy emission 110 and may account for the thermal delay in maintaining the LED 106 at a target temperature during the planned energy emission 110.

In some examples, the controller 105 may generate the thermal profile 116 in response the planned energy emission 110 and cause the LED 106 to be cooled as provided by the thermal profile 116. The controller 105 may determine the thermal profile 116 based on associations between the thermal profile 116 and the operational attributes 112. For example, the thermal profile 116 may be associated with the types of the cooling fluid 108. Alternatively or in addition, the thermal profile 116 may be associated with the shot profile 114 and/or any other of the operational attributes 112.

In other examples, the thermal profile 116 may provide an estimated state of the LED 106 based on the operational attributes 112. The estimated state of the LED 106 may include an expected temperature of the LED 106, an expected efficiency of the LED 106, and expected optical output of the LED 106, and/or other estimations descriptive of the LED 106. For example, the estimated state of the LED 106 may be determined based on the duration and the power of the planned energy emission 110. In other examples, the estimated state of the LED 106 may be determined based on the timing of the planned energy emissions in the shot profile 114. For example, the estimated state of the LED 106 may include an estimated low temperature of the LED 106 between long periods of no inactivity and an estimated high temperature of the LED 106 between rapid energy emissions.

The associations between the thermal profile 116 and the operational attributes 112 may be established, for example, based on research and development, testing, and operational knowledge of the directed energy weapon 102. In some examples, the operational attributes 112 and the thermal profile 116 may be related based on statistical models (not shown). Alternatively or in addition, the associations between the thermal profile 116 and the operational attributes 112 may be stored in a data structure, such as a table (not shown). The controller 105 may identify the thermal profile 116 in the table based on the operational attributes 112 associated with the thermal profile 116. For example, the controller 105 may search the table for the thermal profile 116 using the operational attributes 112.

Thus, there are many examples of controller 105 generating one or more cooling instructions based on the thermal profile 116. In one example, the controller 105 may identify the shot profile 114 and generate cooling instructions prior to a performance of the shot profile 114 by the directed energy weapon 102. Each of the cooling instructions may correspond to a respective planned energy emission of the shot profile 114. The controller 105 may cause the cooling fluid 108 to be applied to the LED 106 in accordance with each of cooling instructions. For example, the controller 105 may communicate the cooling instructions to the cooling source 107 or execute the cooling instructions directly.

In other examples, the controller 105 may generate the cooling instruction 118 with or without the thermal profile 116. For example, the controller 105 may identify, prior to the start of the planned energy emission 110, a predetermined target temperature of the LED 106. The controller 105 may adjust the temperature of the cooling fluid 108 to bring the temperature of the LED 106 closer to the predetermined target temperature.

In another example, controller 105 may determine, prior to the start of the planned energy emission 110, an estimated thermal state of LED 106 the during the planned energy emission 110. The estimated thermal estate may include a predicted temperature of the LED 106 during the planned energy emission 110. The controller 105 may generate the cooling instruction 118 in response to the estimated thermal state. For example, if the estimated state is greater or lower than a predetermined threshold, the controller 105 may generate the cooling instruction 118 configured to adjust the temperature and/or the flow of the cooling fluid 108 so that the temperature of the LED tracks the predetermined threshold.

In a further example, the controller 105 may generate the cooling instruction 118 based on the firing history of the directed energy weapon 102. For example, the controller 105 may determine that the LED 106 has been idle for an extended period of time. In response to the firing history, the controller 105 may generate the cooling instruction 118 to preheat the LED 106 with the cooling fluid 108. In other examples, the controller 105 may perform analysis on the firing history to determine the planned energy emission 110. For example, the controller may use statistical analysis, such as regression analysis, to determine the planned energy emission 110, based on the firing history.

The controller 105 may generate the cooling instruction 118 to control the temperature of the LED 106 with the cooling fluid 108. Examples of the cooling instruction 118 may include a control signal, one or more packets of data sent over a network, a command generated according to a specific protocol, or any other form of analog and/or digital output comprising information indicative of an instruction to control any aspect of the cooling fluid 108. In some examples, the cooling instruction 118 may be generated in accordance with the thermal profile 116. Thus, the controller 105 may generate one more cooling instructions to control the temperature of the LED 106 with cooling fluid 108 in accordance with the thermal profile 116. For example, the thermal profile 116 may provide for increased cooling during the planned energy emission 110 and less cooling outside of the planned energy emission 110. The controller 105 may generate one or more cooling instructions to increase the temperature of the cooling fluid 108 in order to provide the increased cooling during the planned energy emission 100, and decrease the temperature of the cooling fluid in order to provide for less cooling outside of the planned energy emission 110. In other examples, the thermal profile 116 may provide the cooling instruction 118. For example the thermal profile 116 may provide cooling instructions associated with the shot profile 114 and the controller 105 may communicate the instructions to the cooling source 107.

The cooling source 107 may include any component configured to supply the LED 106 with the cooling fluid 108. The cooling source 107 may distribute the cooling fluid 108 to the LED 106. Alternatively or in addition, the cooling source 107 may augment characteristics of the cooling fluid 108 applied to the LED 106. For example, the cooling source 107 may adjust the temperature of the cooling fluid 108 and/or the flow of the cooling fluid 108. In some examples, the cooling source 107 may prepare the cooling fluid 108 by, for example, preheating and/or pre-chilling the cooling fluid 108. In some examples, the cooling source 107 may include multiple components, such as a chiller, heater, valves, pumps, variable pumps and/or any other component for distributing and/or augmenting the cooling fluid 108. The cooling fluid 108 may flow through the LED 106 and return to the cooling source 107. In some examples, the cooling source 107 may include the controller 105. In other examples, the controller 105 may be external to the cooling source 107.

The cooling source 107 may be responsive to the cooling instruction 118. For example, the cooling source 107 may augment the cooling fluid 108 and/or modify how the cooling fluid 108 is applied to the LED 106 in response to the cooling instruction 118. For example, the cooling source 107 may vary the temperature of the cooling fluid 108 in response to the cooling instruction. In other examples, the cooling source 107 may vary the flow of the cooling fluid 108 in response to the cooling instruction 118.

The controller 105 may receive feedforward input 128. The feedforward input 128 may include input predictive of the operation of the directed energy weapon 102. For example, the feedforward input 128 may include the operational attributes 112 that are predictive of a planned operation of the directed energy weapon. The controller 105 may include feedforward logic 130 that is responsive to the feedforward input 128. The feedforward logic 130 may anticipate how to cool the LED 106 with the cooling fluid 108 based on the feedforward input 128. For example, the feedforward logic 130 may anticipate the target temperature and the target flow of the cooling fluid 108 necessary to keep the LED 106 operating at an efficient optical performance though all shot scenarios. In some examples, the feedforward logic 130 may anticipate a thermal change in and/or a thermal behavior of the LED 106 based on the feedforward input 128, and, as a result, generate the cooling instruction 118 to apply the cooling fluid 108 to the LED 106. Alternatively or in addition, the feedforward logic 130 may retrieve the thermal profile 116 associated with the feedforward input 128 and generate the cooling instruction 118 based on the thermal profile 116 as described herein.

The controller 105 may additionally control the temperature of the LED 106 based on feedback input 132. For example, the controller 105 may operate in a closed control loop. The controller 105 may receive feedback input 132 from the closed control loop. The feedback input 132 may include measurements of the directed energy weapon 102, such as temperature measurements of the cooling fluid 108, temperature measures of the LED 106, or any other measurement in the closed control loop. The feedback input 132 may originate from the sensor 126. In some examples, the feedback input 132 may include the operational attributes 112 that are descriptive of changes in the LED 106 during the operation of the LED 106.

The controller 105 may include feedback logic 134 that is responsive to the feedback input 132. The feedback logic 134 may detect thermal changes in the directed energy weapon 102 and react to the thermal changes by generating the cooling instruction 118. Thus, the feedback logic 134 may operate in the closed control loop. For example, the feedback logic 134 may generate a cooling instruction 118 to vary the temperature of the cooling fluid 108 in response to the temperature measurement of the cooling fluid 108 that is above or below a predetermined threshold.

In some examples, the controller 105 may include both the feedforward logic 130 and the feedback logic 134. For example, the controller 105 may receive both the feedback input 132 from the closed control loop and the feed forward input 128. Accordingly, the controller 105 may respond to changes in the dynamics of the directed energy weapon 102 based on the feedback input 132 and anticipate the cooling requirements of the directed energy weapon 102 based on the feedforward input 128.

By implementing the closed loop control with the feedforward logic 134, both the fast and slow response dynamics of the system 100 may be accounted for in the operation of the cooling system. Some or all of the following may be inputs to the controller 105 with the feedforward logic 130: an electrical load (which may occur very quickly), a lag of a thermal heat transfer to the cooling fluid 108, a lag of fluid transport to the cooling source 107, a temperature of the LED 106 and one or more temperatures of the cooling fluid 108, a state of the thermal energy storage, the shot profile 114, the firing history 125, the desired and current LED output efficiency, the desired and current LED optical power output, and the current and desired LED temperature. These inputs may be included in the operation attributes 112 and further categorized as the LED attributes 120, cooling source attributes 122, cooling fluid attributes 124, and/or any other type of the operational attribute 112.

The cooling fluid 108 may include any fluid capable of transferring heat to or away from the LED 106. Examples of the cooling fluid 108 may include propylene glycol (PGW), ethylene glycol (EGW), water, oil, or any other type of coolant. In addition, various types of cooling fluid 108 may be combined. By applying the cooling fluid 108 to the LED 106, the heat generated by the LED 106 may transfer to the cooling fluid 108. In addition, the heat from the cooling fluid 108 may transfer to the LED 106. Thus, controlling the temperature of the cooling fluid 108 applied to the LED 106 may influence the temperature of the LED 106. The system 100 may vary the temperature of the cooling fluid 108 during the operation of the directed energy weapon 102 to maintain the LED 106 at or near the target temperature. In some examples, the target temperature of the LED 106 may be varied over time according to the thermal profile 116.

The target temperature of the LED 106 may include a predetermined desired temperature of the LED 106. The target temperature may vary over the course of the operation of the directed energy weapon. For example, the target temperature may include a first target temperature that occurs before the planned energy emission 110, a second target temperature that occurs during the planned energy emission 110, and/or third target temperature that occurs after the planned energy emission 110. For the example, the first target temperature may be a temperature at which the LED 106 starts to generate an electromagnetic energy emission above a first level of efficiency. The first target temperature may be higher than when the temperature of the LED 106 after the LED 106 is not operated for a substantial period of time. The second target temperature may be, for example, a temperature at which the LED 106 may generate the electromagnetic energy emission at a target power level with at least a second level of efficiency. The third target temperature may be, for example, a temperature between the first target temperature and the second target temperature.

The target temperature (which may include one or more target temperatures or an indication of a temperature function) may be included in the LED attributes 120 of the operational attributes 112 of the directed energy weapon 102. Alternatively or in addition, the target temperature may be included in the thermal profile 116. The controller 105 may generate the cooling instruction 118 and may direct the cooling source 107 to augment the cooling fluid 108 to achieve the target temperature of the LED 106. For example, the cooling source 107, in response to the cooling instruction 118, may adjust the temperature of the cooling fluid 108 to bring the temperature of the LED 106 closer to the target temperature of the LED 106.

In addition to adjusting the temperature of the cooling fluid 108, the controller 105 may adjust the flow of the cooling fluid 108. In some examples, the cooling source 107 may adjust the flow of the cooling fluid 108 applied to the LED 106. For example, increasing the flow may decrease the operating temperature of the LED 106 because, in some thermodynamic scenarios, increasing the flow may increase the rate of thermal energy transfer from the LED 106 to the cooling fluid 108 as the LED 106 operates. Conversely, decreasing the flow may increase the operating temperature of the LED 106 in some thermodynamic scenarios. Furthermore, adjusting the flow may change the time elapsed between when a cooling instruction is received and when the LED 106 reaches a target temperature. For example, increasing the flow may decrease the time elapsed for the LED 106 to reach the target temperature. Conversely, decreasing the flow may increase the time elapsed for the LED 106 to reach the target temperature. The system may adjust the flow rate over the course of the operation of the directed energy weapon 102 to maintain the LED 106 at the target temperature. For example, the thermal profile 116 may provide for adjusting the flow as described herein.

The flow of the cooling fluid 108, as described herein, may refer the flow of cooling fluid 108 delivered to and/or received from the LED 107. For example, the flow of the cooling fluid 108 may include a rate of flow. The rate of flow may describe the rate at which the cooling fluid 108 travels. In some examples, multiple flows of the cooling fluid 108 may combine to form a combined flow.

The target flow may include a target rate at which the cooling fluid 108 travels. Alternatively or in addition, the target flow may include a target ratio of flows in the combined flow. In some examples, the target flow may be predetermined. For example, the target flow may include predetermined information, such as a predetermined rate of flow, stored in the thermal profile 116. In other examples, the controller 105 may dynamically determine the target flow in response to information such as the operational attributes 112.

Figure 2:
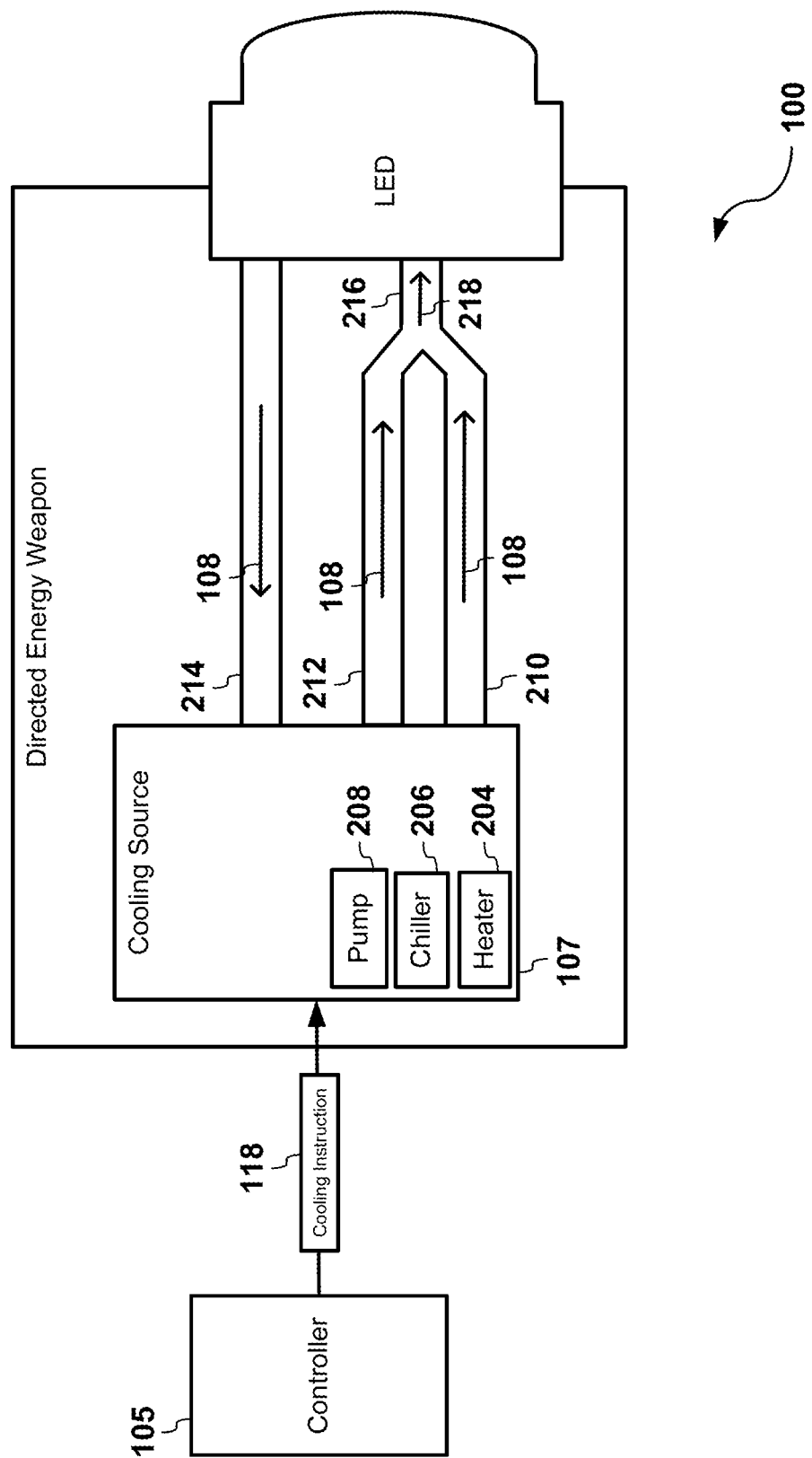
FIG. 2 illustrates an example of a cooling source.

FIG. 2 illustrates an example of the cooling source 107. The directed energy weapon may include the cooling source 107. In other examples, the cooling source 107 may be external to the directed energy weapon. The cooling source 107 may include a heater 204, a chiller 206, a variable pump 208, and any other components for controlling the temperature of the cooling fluid 108 and applying the cooling fluid 108 to the LED 106. The cooling source 107 may be in fluid communication with the LED 106. For example, the cooling source 107 may be configured to send the cooling fluid 108 to the LED 106 and receive the cooling fluid 108 from the LED 106.

The directed energy weapon 102 may include a first inflow 210 to the LED 106, a second inflow 212 to the LED 106 and an outflow 214 from the LED 106. The outflow 214 may direct the cooling fluid 108 out of the LED 106. The first inflow 210 and the second inflow 212 may direct the cooling fluid 108 to the LED 106. In some examples, the cooling fluid 108 of first inflow 210 and the cooling fluid 108 of the second inflow 212 may combine to adjust the temperature of the cooling fluid 108. For example, the first inflow 210 may provide the cooling fluid 108 at a first temperature and the second inflow 212 may provide the cooling fluid 108 at a second temperature. The first inflow 210 and the second inflow 212 may join to form a combined inflow 216 of a cooling fluid mixture 218 at a third temperature that is applied to the LED 106. The first inflow 210 and the second inflow 212 may combine before the cooling fluid 108 reaches the LED 106 as illustrated in FIG. 2. Alternatively, the first inflow 210 and the second inflow 212 may combine in the LED 106. In alternative examples, the number of inflows and/or outflows may differ from the example illustrated in FIG. 2.

In some examples, the cooling instruction 118 and/or the thermal profile 116 may include information descriptive of how to combine the first inflow 210, the second inflow 212 and any other number of inflows. For example, the thermal profile 116 and/or the cooling instruction 118 may provide for a target ratio of the cooling fluid 108 from the first inflow 210 and the cooling fluid 108 from the second inflow 212. In addition, the thermal profile 116 and/or the cooling instruction 118 may provide for the target temperature of the cooling fluid 108 in each of the first inflow 210, the second inflow 212, and/or the combined inflow 218.

The controller 105 may vary the temperature of the cooling fluid 108 applied to the LED 106. For example, the cooling source 107 may provide the cooling fluid 108 at a starting temperature that is colder than desired, and the heater 204 may variably heat the cooling fluid 108 to temperatures above the starting temperature in order to variably control the temperature of the LED 106. Alternatively or in addition, the cooling source 107 may provide the cooling fluid 108 at starting temperature that is hotter than desired and then variably cool the cooling fluid 108 to a temperature below the starting temperature in order to variably control the LED 106.

Figure 3:
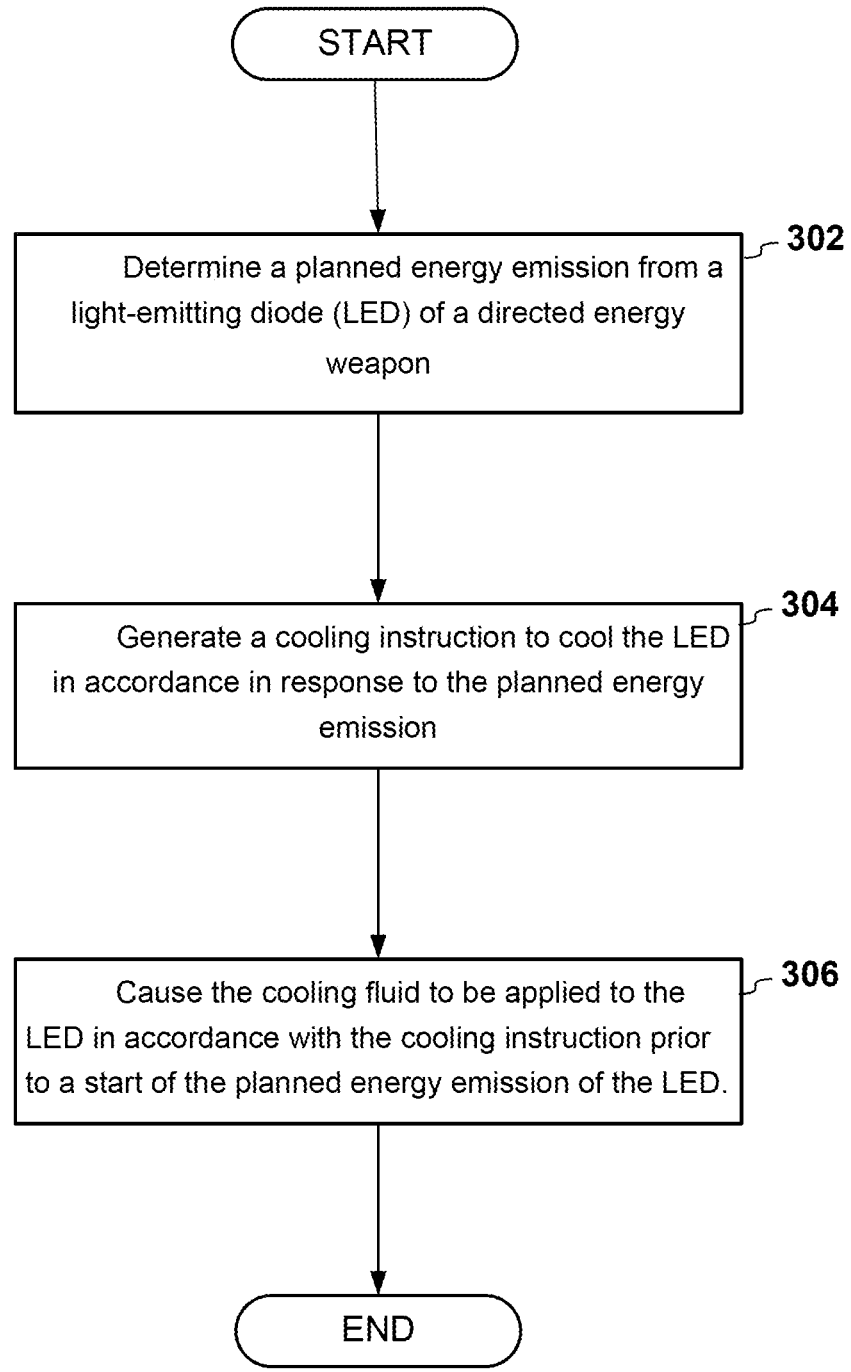
FIG. 3 illustrates a flow diagram of example logic of a system for thermal management of a directed energy weapon.

FIG. 3 illustrates a flow diagram of example logic of the system 100. When the controller 105 starts, the controller 150 may determine the planned energy emission 110 from the LED 106 of the directed energy weapon 102 (302). In some examples, the controller 105 may search a queue of future targets of the directed energy weapon 102 and determine a future time when the directed energy weapon 102 is expected to fire. Alternatively or in addition, the controller 105 may receive the shot profile 114 and identify the planned energy emission 110 in the shot profile 114. In other examples, the controller 105 may receive the planned energy emission 110 from a targeting system, a mission planning system, or other examples of systems related to operation of the directed energy weapon 102.

The controller 105 may generate a cooling instruction 118 to cool the LED 106 with the cooling fluid 108 in response to the planned energy emission 110 (304). For example, the controller 105 may predict the estimated thermal state of the LED 106 during to planned energy emission 110. For example, the estimated thermal state may include an increase of the temperature of the LED 106 during a planned firing of the laser at a predetermined time in the future. The controller 105 may generate a cooling instruction (which may include multiple cooling instructions) to cool the LED 106 at the predetermined time. The cooling instruction may include one or more instructions to vary the temperature of the cooling fluid 108 at predetermined times. Alternatively or in addition, the cooling instruction 118 may be configured to vary the rate of the flow of the cooling fluid 108 at the predetermined times. In other examples, the cooling instruction 118 may be configured to vary the ratio of the first inflow 210 and the second inflow 212.

The controller 105 may cause the cooling fluid 108 to be applied to the LED 106 in accordance with the cooling instruction 118 prior to a start of the planned energy emission 110 of the LED 106 (306). For example, the controller 105 may communicate the cooling instruction 118 to the cooling source 107 directing the cooling source 107 to apply the cooling fluid 108 to the LED 106. Alternatively, the controller 105 may execute the cooling instruction 118 in order to control the cooling fluid 108 applied to the LED 106. For example, the controller 105 may vary the temperature and/or the flow of the cooling fluid 108 applied to the LED 106 according to the cooling instruction 118.

The logic illustrated in FIG. 3 may include additional, different, or fewer operations. For example, the logic illustrated in FIG. 3 may also include an operation to identify the operational attributes 112 of the directed energy weapon 102. In some examples, the logic may further include an operation to receive the feedforward input 128 that includes the operational attributes 112. Alternatively or in addition, the logic may include an operation to receive the feedback input 132.

The logic illustrated in FIG. 3 may further include an operation to identify the thermal profile 116 associated with the operational attributes 112. For example, the operation may include searching a table for an association between the thermal profile 116 and the operational attributes 112. Alternatively or in addition, the operation may include determining the thermal profile 116 by predicting an estimated thermal state and/or a thermal behavior of the LED 106 based on the operational attributes 112. For example, the operation may predict the thermal change to be caused by the planned energy emission 110.

In further examples of the logic illustrated in FIG. 3, the logic may include an operation to generate a cooling instruction 118 to cool the LED 106 in accordance with the thermal profile 116. In addition, the logic may include an operation to control the temperature of the cooling fluid 108, and operation to control the flow of the cooling fluid 108, or operations to implement any features described herein.

Figure 4:
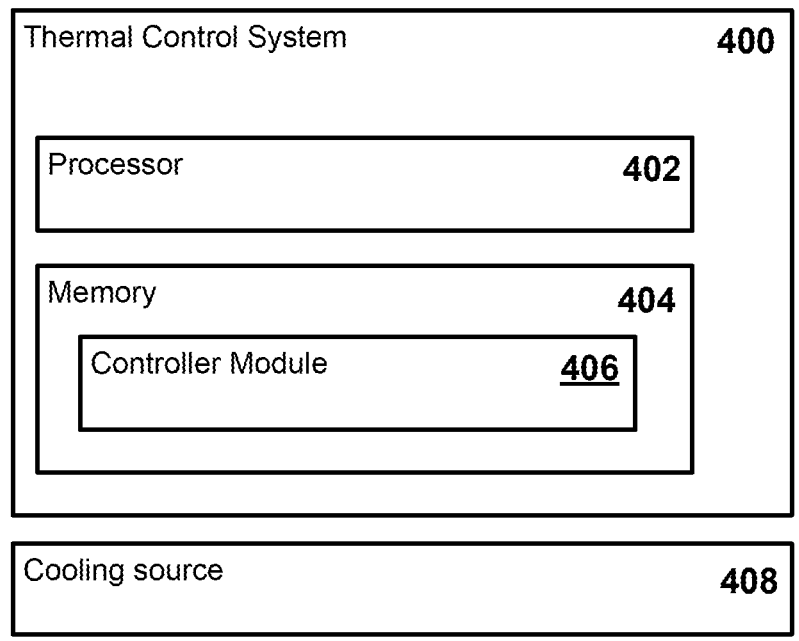
FIG. 4 illustrates an example of the thermal control system for a directed energy weapon.

FIG. 4 illustrates an example of a thermal control system 400 of the system 100 for thermal management of the directed energy weapon 102. The thermal control system 400 may include a processor 402 and a memory 404. The memory 404 may include a controller module 406.

The processor 402 may be in communication with the memory 404. In some examples, the processor 402 may also be in communication with additional elements, such as the cooling source 408 and/or any components of the cooling source 408. For example, the processor may be in communication with components of the cooling source 408, such as the variable pump 208, the heater 204 and/or the chiller 206 illustrated in FIG. 2. Examples of the processor 402 may include a general processor, a central processing unit, a microcontroller, a server, an application specific integrated circuit (ASIC), a digital signal processor, a field programmable gate array (FPGA), a digital circuit, and/or an analog circuit.

The processor 402 may be one or more devices operable to execute logic. The logic may include computer executable instructions or computer code embodied in the memory 404 or in other memory that when executed by the processor 402, cause the processor 402 to perform the features implemented by the logic. The computer code may include instructions executable with the processor 402.

The memory 404 may be any device for storing and retrieving data or any combination thereof. The memory 304 may include non-volatile and/or volatile memory, such as a random access memory (RAM), a read-only memory (ROM), an erasable programmable read-only memory (EPROM), and/or flash memory. Alternatively or in addition, the memory 404 may include an optical, magnetic (hard-drive) or any other form of data storage device.

The controller module 406 may be any module configured with the logic of the system 100 to control the temperature of the LED 106 with the cooling fluid 108. For example the controller module 306 may include the controller 105. As illustrated in FIG. 4, the controller module 406 may be separate from the cooling source 408. In other examples, the cooling source 408 may include the controller module 406. Furthermore, the controller module may be included in a directed energy weapon or may be separate from the directed energy weapon.

The term "cooling" may be broadly interpreted. For example, the cooling fluid 108 may be used to cool and/or warm. As another example, the cooling instruction 118 may be an instruction to cool or warm the LED 106. As yet another example, the cooling source 107 may be a device that heats and/or cools the cooling fluid 108. In still another example, the cooling source attributes 122 may relate to cooling and/or heating. According, the thermal control system 400 and the system 100 for thermal management of the directed energy weapon 102 may be configured to cool and/or heat the LED 106. The thermal control system 400 and the system 100 for thermal management of the directed energy weapon 102 may include and/or be referred to as a conditioning system.

Each component may include additional, different, or fewer components. For example, the controller module 406 may include multiple modules. For example, the controller module 406 may include the feedforward logic 130 and/or the feedback logic 134. Similarly, the memory 404 may include multiple modules. Alternatively or in addition, the memory 404 may include the database (not shown) of information relating to the thermal profile as described herein.

The system 400 may be implemented with additional, different, or fewer components. For example, the system 400 may additionally include communications hardware (not shown) for communicating the cooling source 408 or other components of the directed energy weapon. For example, the cooling instruction, as described herein, may be communicated via the communications hardware to the cooling source 408.

The system 400 may be implemented in many different ways. Each module, such as the controller module 406, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 404, for example, that comprises instructions executable with the processor 402 or other processor to implement one or more of the features of the module. When any one of the module includes the portion of the memory that comprises instructions executable with the processor, the module may or may not include the processor. In some examples, each module may just be the portion of the memory 404 or other physical memory that comprises instructions executable with the processor 402 or other processor to implement the features of the corresponding module without the module including any other hardware. Because each module includes at least some hardware even when the included hardware comprises software, each module may be interchangeably referred to as a hardware module, such as the location specific assistance module hardware module.

Some features are shown stored in a computer readable storage medium (for example, as logic implemented as computer executable instructions or as data structures in memory). All or part of the system 400 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 400 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the combination of various modules illustrated is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In some examples, the instructions are stored on a removable media device for reading by local or remote systems. In yet other examples, the logic or instructions are stored within a given computer, central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system for thermal management of a directed energy weapon, the system comprising:
 a processor configured to:
 determine a planned energy emission from a light-emitting diode (LED) of the directed energy weapon;
 generate a cooling instruction to control a cooling fluid in response to the planned energy emission; and
 cause a temperature of the LED to be influenced by the cooling fluid in accordance with the cooling instruction prior to a start of the planned energy emission from the LED.

2. The system of aspect 1, wherein the processor is further configured to search a table for a thermal profile associated with the planned energy emission, wherein the cooling instruction includes an instruction to control the cooling fluid in accordance with the thermal profile.

3. The system of any of aspects 1 to 2, wherein the thermal profile comprises variable temperatures of the cooling fluid, the variable temperatures comprising a plurality of target temperatures of the cooling fluid over a duration of the planned energy emission.

4. The system of any of aspects 1 to 3, wherein the thermal profile comprises variable flows, the variable flows comprising a plurality of target rates of flow of the cooling fluid over a duration of the planned energy emission.

5. The system of any of aspects 1 to 4, wherein the processor is further configured to:
 identify a shot profile of the directed energy weapon, the shot profile comprising a plurality of planned energy emissions; and
 generate a plurality of cooling instructions prior to a performance of the shot profile by the directed energy weapon, each cooling instructions corresponding to a respective planned energy emission of the shot profile; and
 cause the cooling fluid to be applied to the LED in accordance with each cooling instruction.

6. The system of any of aspects 1 to 5, wherein the planned energy emission comprises a time of the planned energy emission, a duration of the planned energy emission, and a power level of the planned energy emission.

7. The system of any of aspects 1 to 6, wherein the processor is further configured to determine a firing history of the directed energy weapon, the firing history including a time of a previous energy emission, wherein the cooling instruction is further based on the firing history of the directed energy weapon.

8. A method comprising:
 determining a planned energy emission from a light-emitting diode (LED) of a directed energy weapon;
 generating a cooling instruction in response to the planned energy emission, the cooling instruction including an instruction to apply a cooling fluid to the LED; and applying the cooling fluid to the LED with in accordance with the cooling instruction to influence a temperature of the LED prior to a start of the planned energy emission.

9. The method of aspect 8 further comprising:
predicting, prior to the start of the planned energy emission, an estimated state of the LED during the planned energy emission, wherein the cooling instruction is based on the estimated thermal state of the LED.

10. The method of any of aspects 8 to 9, further comprising:
identifying an operational attribute of the directed energy weapon; and
identifying a thermal profile associated with the operational attribute, wherein the cooling instruction is responsive by a cooling source to apply a cooling fluid to the LED in accordance with the thermal profile.

11. The method of any of aspects 8 to 10, wherein the operational attributes include a type of the cooling fluid.

12. The method of any of aspects 8 to 11, wherein the operational attributes include a thermal delay of the cooling source.

13. The method of any of aspects 8 to 12, wherein the step of applying the cooling fluid to the LED further comprises preheating the LED with the cooling fluid prior to the planned energy emission and cooling the LED with the cooling fluid during the planned energy emission.

14. The method of any of aspects 8 to 13, further comprising:
identifying, prior to the start of the planned energy emission, a predetermined target temperature of the LED; and
adjusting a temperature of the cooling fluid to bring the temperature of the LED closer to the predetermined target temperature.

15. A thermal control system for a directed energy weapon, the thermal control system comprising:
a processor; and
a controller module executable by the processor to determine a planned energy emission from a light-emitting diode (LED) of the directed energy weapon, generate a cooling instruction to influence a temperature of the LED of the directed energy weapon with a cooling fluid in response to the planned energy emission, and cause the cooling fluid to be applied to the LED in accordance with the cooling instruction prior to a start of the planned energy emission of the LED.

16. The thermal control system of aspect 15, further comprising:
a cooling source in fluid communication with the LED, the cooling source responsive to the cooling instruction to apply cooling fluid to the LED in accordance with the cooling instruction.

17. The thermal control system of any of aspects 15 to 16, wherein the controller module is further executable by the processor to control a flow of the cooling fluid applied to the LED in accordance with the cooling instruction.

18. The thermal control system of any of aspects 15 to 17 wherein the cooling instruction includes an instruction to vary a rate of the flow of the cooling fluid.

19. The thermal control system of any of aspects 15 to 18 wherein the controller module is further executable by the processor combine a first flow of the cooling fluid at a first temperature with a second flow of the cooling fluid at a second temperature to form a combined flow and cause the combined flow to be applied the LED.

20. The thermal control system of any of aspects 15 to 19 wherein the controller module is further executable by the processor to:
identify a thermal profile associated with the planned energy emission, the thermal profile comprising a predetermined ratio of flows; and
control a ratio of the first flow and the second flow in accordance with the thermal profile.

What is claimed is:

1. A system for thermal management of a directed energy weapon, the system comprising:
a processor configured to:
identify a shot profile of the directed energy weapon, the shot profile comprising a plurality of planned energy emissions from a light-emitting diode (LED) of the directed energy weapon;
identify, prior to a start of a respective one of the planned energy emissions, a thermal profile associated with the respective one of the planned energy emissions, the thermal profile comprising a predetermined target temperature of the LED;
generate a plurality of cooling instructions prior to a performance of the shot profile by the directed energy weapon, each of the cooling instructions corresponding to the respective one of the planned energy emissions of the shot profile, a each of the cooling instructions configured to cause a cooling source to adjust a temperature of a cooling fluid to the predetermined target temperature of the thermal profile associated with the respective one of the planned energy emissions; and
cause the cooling fluid to be applied to the LED in accordance with each of the cooling instructions, wherein each of the cooling instructions is configured to cause the cooling source to adjust the temperature of the cooling fluid applied to the LED in accordance with a respective one of the cooling instructions prior to the start of the respective one of the planned energy emissions from the LED.

2. The system of claim 1, wherein the processor is further configured to search a table for the thermal profile associated with the respective one of the planned energy emissions, wherein the respective one of the cooling instructions includes an instruction to control the cooling fluid in accordance with the thermal profile.

3. The system of claim 1, wherein the thermal profile comprises variable temperatures of the cooling fluid, the variable temperatures comprising a plurality of target temperatures of the cooling fluid over a duration of the respective one of the planned energy emissions.

4. The system of claim 1, wherein the thermal profile comprises variable flows, the variable flows comprising a plurality of target rates of flow of the cooling fluid over a duration of the respective one of the planned energy emissions.

5. The system of claim 1, wherein each of the planned energy emissions comprises a respective time of each of the planned energy emissions, a respective duration of each of the planned energy emissions, and a respective power level of each of the planned energy emissions.

6. The system of claim 1, wherein the processor is further configured to determine a firing history of the directed energy weapon, the firing history including a time of a previous energy emission, wherein each of the cooling instructions is further based on the firing history of the directed energy weapon.

7. A method comprising:
identifying, by a processor, a shot profile of a directed energy weapon, the shot profile comprising a plurality of planned energy emissions from a light-emitting diode (LED) of a directed energy weapon;

identifying, by the processor, prior to a start of a respective one of the planned energy emissions, a thermal profile associated with the respective one of the planned energy emissions, the thermal profile comprising a predetermined target temperature of the LED;

generating, by the processor, in response to the plurality of planned energy emissions, a plurality of cooling instructions prior to a performance of the shot profile by the directed energy weapon, each of the cooling instructions corresponding to the respective one of the planned energy emissions of the shot profile, each of the cooling instructions including an instruction to cause a cooling source to apply a cooling fluid to the LED at the predetermined target temperature of the thermal profile; and causing, by the processor, the cooling fluid to be applied to the LED in accordance with each of the cooling instructions, wherein each of the cooling instructions causes the cooling source to apply the cooling fluid to the LED in accordance with a respective one of the cooling instructions to influence a temperature of the LED and to bring the temperature of the LED closer to the predetermined target temperature prior to the start of the respective one of the planned energy emissions.

8. The method of claim 7, further comprising:
predicting, by the processor, prior to the start of each of the planned energy emissions, an estimated thermal state of the LED during the respective one of the planned energy emissions, wherein each of the cooling instructions is based on the estimated thermal state of the LED.

9. The method of claim 7, wherein the thermal profile comprises a plurality of predetermined target temperatures for each of the planned energy emissions, the method further comprising
causing the cooling source to apply the cooling fluid to the LED in accordance with each of the cooling instructions to influence the temperature of the LED and to bring the temperature of the LED closer to the predetermined target temperatures.

10. The method of claim 7, further comprising:
identifying, by the processor, an operational attribute of the directed energy weapon; and
selecting, by the processor, the thermal profile in response to the thermal profile being associated with the operational attribute and the respective one of the planned energy emissions.

11. The method of claim 10, wherein the operational attribute includes a type of the cooling fluid.

12. The method of claim 10, wherein the operational attribute includes a thermal delay of the cooling source.

13. The method of claim 7, wherein the causing, by the processor, the cooling source to apply the cooling fluid to the LED further comprises preheating the LED with the cooling fluid prior to the respective one of the planned energy emissions and cooling the LED with the cooling fluid during the respective one of the planned energy emissions.

14. A thermal control system for a directed energy weapon, the thermal control system comprising:
a processor; and
a controller module executable by the processor to
identify a shot profile of the directed energy weapon, the shot profile comprising a plurality of planned energy emissions from a light-emitting diode (LED) of the directed energy weapon,
identify, prior to a start of a respective one of the planned energy emissions, a thermal profile associated with the respective one of the planned energy emissions, the thermal profile comprising a predetermined target temperature for the LED,
generate, in response to the plurality of planned energy emissions, a plurality of cooling instructions prior to a performance of the shot profile by the directed energy weapon, each of the cooling instructions corresponding to the respective one of the planned energy emissions of the shot profile, each of the cooling instructions configured to cause a cooling source to adjust a temperature of a cooling fluid applied to the LED to bring a temperature of the LED closer to the predetermined target temperature, and
cause the cooling fluid to be applied to the LED in accordance with each of the cooling instructions, wherein each of the cooling instructions is configured to cause the cooling source to adjust the temperature of the cooling fluid applied to the LED in accordance with a respective one of the cooling instructions prior to the start of the respective one of the planned energy emissions of the LED.

15. The thermal control system of claim 14, wherein the controller module is further executable by the processor to control a flow of the cooling fluid applied to the LED in accordance with each of the cooling instructions.

16. The thermal control system of claim 15, wherein each of the cooling instructions includes an instruction to vary a rate of the flow of the cooling fluid.

17. The thermal control system of claim 14, wherein the controller module is further executable by the processor combine a first flow of the cooling fluid at a first temperature with a second flow of the cooling fluid at a second temperature to form a combined flow and cause the combined flow to be applied the LED.

18. The thermal control system of claim 17, wherein the thermal profile further comprises a predetermined ratio of flows, wherein the controller module is further executable by the processor to:
control a ratio of the first flow and the second flow in accordance with the thermal profile.

* * * * *